Figure 1:
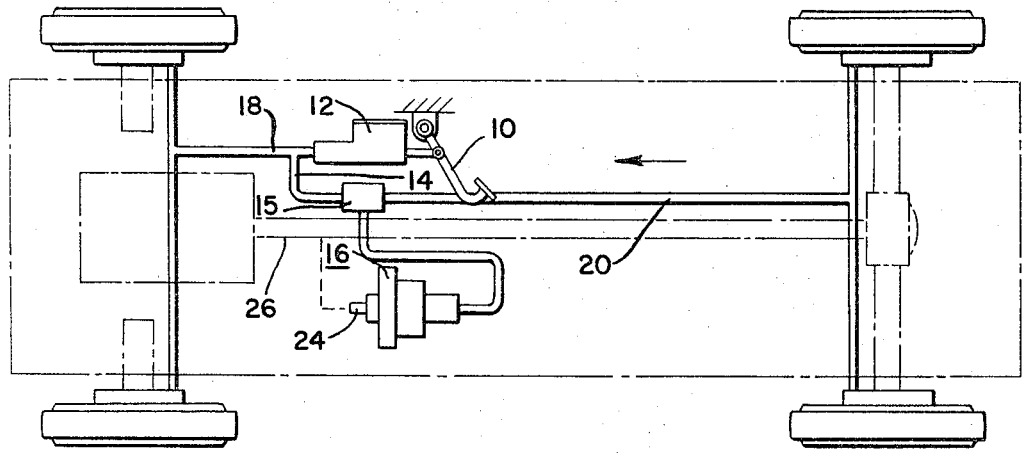

March 28, 1967 R. A. HORVATH 3,311,423
BRAKE ANTI-LOCK INERTIA COMPENSATED SENSING UNIT
Filed Nov. 10, 1965

INVENTOR.
Robert A. Horvath
BY
Donald P. Selvecki
His Attorney

United States Patent Office 3,311,423
Patented Mar. 28, 1967

3,311,423
BRAKE ANTI-LOCK INERTIA COMPENSATED
SENSING UNIT
Robert A. Horvath, Dayton, Ohio, assignor to General Motors Corporation, Detroit, Mich., a corporation of Delaware
Filed Nov. 10, 1965, Ser. No. 507,140
5 Claims. (Cl. 303—21)

This invention relates to braking mechanisms and more particularly to a brake anti-lock device.

Brake anti-lock devices found in the prior art generally respond either to vehicle wheel deceleration or to vehicle linear deceleration. The failure to distinguish between the two types of deceleration makes these devices limited in their acceptability. It is obvious that a vehicle will reach an incipient skid condition sooner using a given braking force when traveling on a wet surface than when traveling on a dry surface. A device that is responsive to vehicle wheel angular deceleration provides a safety factor when a vehicle is traveling on a wet surface because brake pressure is shut off to affected wheels when the wheels tend to lock and the incipient skid condition is reached. However, this same system used on a vehicle traveling on a dry road surface would not sense the vehicle linear deceleration and, therefore, would respond only to wheel angular deceleration thereby cutting off braking pressure to affected wheels prematurely.

An analogous situation occurs when a device responsive to vehicle linear deceleration alone is utilized on a vehicle. When a vehicle is traveling on a dry road surface with a given brake pressure input, the device can be calibrated to respond at a point when the incipient skid condition is reached, thereby releasing the vehicle brake to prevent brake lock-up. However, when using this device with the same brake pressure input while traveling on a wet road surface, the vehicle brakes may lock up almost immediately with the vehicle linear deceleration being very slow. In this case, the incipient skid condition will have already been passed with the vehicle slowly decelerating linearly and the brakes locked. The device, being responsive only to vehicle linear deceleration, will not act to shut off braking pressure and a vehicle skid will inevitably ensue.

It is an object of the present invention to provide an improved anti-skid device that is responsive to vehicle wheel angular deceleration modulated by vehicle linear deceleration.

It is another object of the present invention to provide an improved brake anti-lock device that is driven at a speed proportional to the vehicle wheel but which is so positioned on the vehicle as to be responsive to vehicle linear deceleration as well.

It is still another object of the present invention to provide an improved brake anti-lock device which responds to predetermined differences in rotational speed of an inertial weight and the vehicle wheels but which response is modulated by a shifting of the inertial device into a disc brake which tends to equalize the rotational speed between the vehicle wheels and the inertial weight.

It is a further object of the present invention to provide an improved brake anti-lock device which utilizes a camming action to axially move a valve actuating mechanism into an operative disposition to shut off vehicle brake pressure when a vehicle incipient skid condition is encountered.

Further objects and advantages of the present invention will be apparent from the following description, reference being had to the accompanying drawings wherein a preferred embodiment of the present invention is clearly shown.

Figure 2:
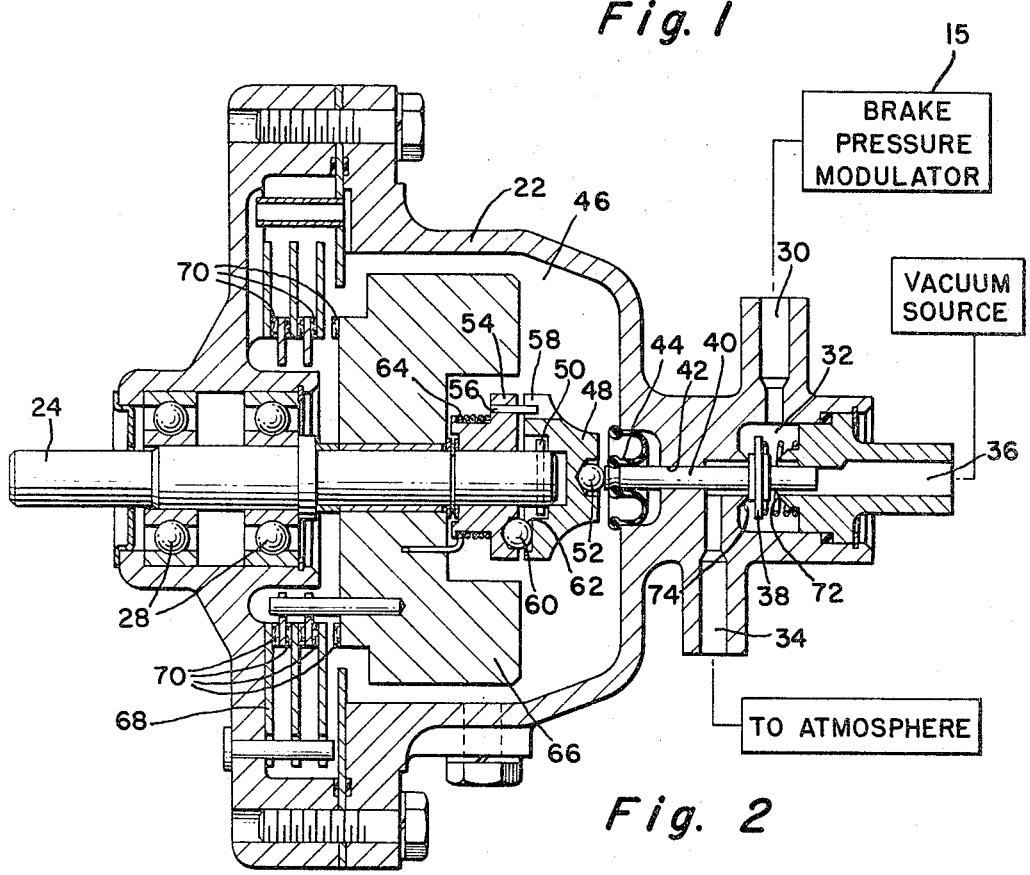

In the drawings:
FIGURE 1 is a diagrammatic illustration of a vehicle with the subject invention shown in its operative environment;
FIGURE 2 is a sectional view of the subject invention shown in FIGURE 1.

Referring to FIGURE 1, a brake pedal 10 is operatively connected to an hydraulic master cylinder 12 which provides fluid under pressure through line 14 to brake pressure modulator 15. Line 18 going to the vehicle front wheel brakes is generally allowed unimpeded passage but line 20 communicating pressure to the vehicle rear wheel brakes is selectively cut off by the operation of the anti-lock device 16 in a manner to be hereinafter described. It is understood in the illustration used herein that the rear wheel brakes of the vehicle are designated as the vehicle wheel brakes most likely to create a brake lock condition because the effective weight shift during braking of the vehicle will be toward the front wheel brakes. Therefore, the effective weight on the front wheels which must be stopped by the front wheel brakes is greater which results in a greater likelihood of the rear wheel brakes locking before the front wheel brakes.

Housing 22 for anti-lock device 16 is positioned parallel to the longitudinal axis of the vehicle in the relative position seen in FIGURE 1 and includes a drive shaft 24 driven by a portion of the drive train 26 of the vehicle.

Referring to FIGURE 2, drive shaft 24 is rotatably mounted in one end of housing 22 and is rotationally contained by bearings 28. On an opposite end of housing 22, outlet 30 from line 14 to the modulator 15 communicates a vacuum pressure from chamber 32. Chamber 32 has an inlet 34 from the atmosphere and an inlet 36 from a vacuum source. Sliding valve means 38 is adapted to selectively control pressure between outlet 30 and inlet 36 while selectively allowing fluid communication between outlet 30 and inlet 34. Valve driver 40 is slidable in bore 42 and seal 44 is carried by drive shaft 40 to seal chamber 32 from chamber 46.

Cam means 48 is non-rotatably carried with respect to drive shaft 24 by pin 50 but is axially slidable relative thereto. Ball 52 establishes a driving connection between cam means 48 and valve drive shaft 40. Spring carrier means 54 is rotatably carried by drive shaft 24 and includes pin 56 that cooperates with arcuate slot 58 in cam means 48 to provide a lost motion connection between spring carrier 54 and cam means 48. Ball 60 carried by spring carrier 54 engages inclined ramp 62 of cam means 48 to adapt a separation thereof along the longitudinal axis of drive shaft 24 during certain periods of operation.

Torsion spring 64 is carried by spring carrier means 54 and operatively engages flywheel or weight means 66. Therefore, it is clear that a rotating force from drive shaft 24 is transmitted through non-rotatable cam means 48 to spring carrier means 54 through pin 50 and ultimately to weight means 66 through torsion spring 64. In this manner, weight means 66 is rotationally driven by drive shaft 24.

A disc brake means 68 is a variable torque type clutch and is carried by housing 22 operatively engageable by friction element 70 carried by weight means 66. The discs and the interior portions of housing 22 excluding valve means 38 are a wet design and, therefore, are constantly lubricated during operation of the device. However, it is obvious that a dry design might be used without detracting from the spirit of the invention disclosed.

In operation, the master cylinder 12 shown in FIGURE 1 provides a braking pressure producing source for the front and rear brakes of the vehicle. Anti-lock device 16 is situated in a manner where it can selectively control the vacuum pressure communicated to the modulator through outlet 30 from inlet 36. The anti-lock device 16 is situated so that the longitudinal axis of drive shaft 24 faces in the same direction as the longitudinal axis of the vehicle. Shaft 24 is driven in any well-known manner from the vehicle drive train 26 as, for example, by a belt driven pulley. Modulator 15 is a vacuum controlled valve of common design which selectively modulates braking pressure from a pressure source in response to changes in vacuum pressure.

When a vehicle brake energization is desired under normal circumstances, that is, when abrupt vehicle deceleration is not necessary, anti-lock device 16 maintains a free fluid communication between inlet 36 and outlet 30 allowing vacuum to go to modulator 15. Device 16 is designed to function only under severe braking conditions which would make a selected group of vehicle wheels approach the incipient skid condition. As previously stated, the incipient skid condition is dependent on both vehicle linear deceleration and vehicle wheel angular deceleration. The subject device distinguishes between the two in a manner diffferent from prior art devices which require calibration for wet or dry road surface operation.

When the vehicle brakes are applied in a manner which would be likely to cause a vehicle skid, the following sequence of events takes place.

Drive shaft 24 is rotationally driven at a speed proportional to the vehicle speed. Therefore, weight means 66 follows this rotation in the manner previously described. Prior to reaching an incipient skid condition, valve means 38 is positioned as shown in FIGURE 2 wherein valve 38 is seated at 74 and free fluid communication is had between inlet 36 and outlet 30. When the brakes are violently applied and the vehicle is traveling on a dry road surface, the vehicle will be very quickly linearly decelerated and weight 66 will slide on drive shaft 24 toward bearings 28. Friction element 70 will frictionally engage disc 68 causing a rotationaal impedance of weight means 66. The device is designed so that weight means 66 is thereby slowed down and, during the earlier stages of the action, torsion spring 64 takes up the force generated by the overrunning weight 66 relative to drive shaft 24. If the change in rotation of drive shaft 24 is so great that the disc brake does not slow weight means 66 sufficiently, a rotational force is placed on spring carrier means 54 which causes ball 60 to rotate on ramp 62 carried by cam means 48. Cam means 48 is non-rotatable with respect to drive shaft 24 so ball 60 induces an axial movement in cam means 48.

When cam means 48 is moved axially toward valve means 38, ball 52 engaging drive shaft 40 moves valve means 38 off seat 74 into sealing engagement with seat 72. Vacuum pressure communication between outlet 30 and inlet 36 is thereby cut off and atmospheric pressure is communicated to outlet 30. Further brake pressure build-up in the vehicle wheel brakes serviced by line 20 ceases due to a braking pressure shut off and relief in modulator 15. The device is designed so that this brake pressure cutoff occurs as the incipient skid condition is encountered and, therefore, actual wheel lock-up is not encountered. It is therefore seen that the subject device first attempts to compensate for vehicle linear deceleration by a shifting of weight means 66 to attempt to match the rotational speed of drive shaft 24. If the rotational speeds cannot be substantially matched, the deceleration of the vehicle is so great that the incipient skid condition is encountered and actual vehicle skid is prevented.

When severe braking occurs on a wet road surface, a given brake pressure input from master cylinder 12 will result in a faster chain of events which are now described. On a wet road surface, the difference in rotational speed between drive shaft 24 and the weight means 66 is more quickly generated because the rolling friction between the wheels and the road surface is lower. Therefore, with drive shaft 24 rotating at a given speed, an application of the vehicle brakes will result in a very quick change in the speed of drive shaft 24 resulting in weight means 66 overrunning sooner than in the situation previously described. Vehicle linear deceleration will be less than on a dry road surface so that weight means 66 will not be quickly braked by the disc brake 68 and a relative difference in rotational speed will immediately exist between weight means 66 and drive shaft 24. As weight means 66 overruns drive shaft 24, torsion spring 64 engaging spring carrier means 54 causes a difference in relative rotational speed between spring carrier means 54 and cam means 48. Ball 60 carried by spring carrier means 54 will move on ramp 62 limited by pin 56 resulting in an axial shifting of cam means 48 toward valve means 38. Valve means 38 is quickly driven into seat 72 resulting in a cutting off of vacuum pressure to outlet 30 and consequently modulator 15 with atmospheric pressure bled thereinto. Further brake pressure build-up is prevented at the controlled wheel brakes and vehicle skidding is avoided.

The utility of the subject device is extended by the sensing of vehicle linear deceleration by use of the shifting of weight means 66 while wheel angular deceleration is sensed through drive shaft 24. By this dual sensing function, the anti-lock device 16 delays the response of the device when rapid wheel deceleration is had and the vehicle is traveling on the dry road surface because, under these circumstances, vehicle linear deceleration is also great. Therefore, greater braking pressure can be tolerated before an incipient skid condition occurs on a dry road surface and the subject device effectively senses this fact.

When a vehicle is traveling on a wet road surface, lesser braking force can be tolerated before the incipient skid condition is encountered and the subject device senses this fact by the inertial weight which is not axially shifted unless vehicle linear deceleration is of a sufficient magnitude. Therefore, braking pressure is shut off earlier when a vehicle travels on a wet road surface than when traveling on a dry road surface.

The compactness of the subject invention lends to its utility in that a single unit can be appropriately positioned in a vehicle and utilized to monitor one or more vehicle brakes likely to cause skidding. It is understood that different vehicle weight distribution might necessitate a monitoring of vehicle brakes other than the rear brakes shown in the example. The design of the vehicle and, in some cases, the terrain normally encountered by the vehicle may dictate the response rate of the system or which wheel brakes are controlled.

While the embodiment of the present invention, as herein disclosed, constitutes a preferred form, it is to be understood that other forms might be adopted.

What is claimed is as follows:

1. A brake anti-lock device comprising: a housing carried by a vehicle drive means rotatably carried in said housing and being rotated at a speed proportional to vehicle wheel speed; an inlet in said housing from a source of pressure and an outlet in said housing to a modulator for vehicle brakes; valve means slidably disposed in said housing and arranged to selectively control fluid communication between said inlet and said outlet; weight means rotatably carried on said drive means and translationally slidable thereon in response to abrupt changes in vehicle speed; and valve actuating means, said valve actuating means includes cam means axially slidable on said drive means and non-rotatable with respect thereto, spring carrier means carried by said drive means and adapted for limited rotational movement with respect to said cam means, and a torsion spring engaging said spring carrier means and said weight means in a manner accommodating limited relative rotational movement of said weight means and being non-restrictive of sliding movement of said weight means, differences in speed between said weight means and said drive means inducing relative rotational movement in said spring carrier means and consequent axial movement of said cam means whereby said valve means is translationally axially moved to control fluid communication between said inlet and outlet, said difference in speed being caused by a rotating weight means tending to maintain a rotational speed while said drive means has already responded to a decrease in vehicle wheel speed.

2. A brake anti-lock device comprising: a housing carried in substantial alignment with the longitudinal axis of the vehicle; a drive shaft rotatably carried in said housing and being driven at a speed proportional to the vehicle speed by a portion of the drive train from the vehicle, said drive shaft being aligned with the longitudinal axis of the vehicle; an inlet from a pressure source formed in a portion of said housing and an outlet to a modulator for pressure operable brakes formed in an area of the housing juxtaposed to said inlet; valve means slidably disposed in said housing and arranged to selectively control fluid communication between said inlet and said outlet; cam means arranged to rotate with said drive shaft and engageable with said valve means, said cam means being slidable along the longitudinal axis of said drive shaft; spring carrier means rotatably carried by said drive shaft and forming a lost motion connection with said cam means, said spring carrier means including camming means adapted to drive said cam means axially into said valve means; weight means rotatably carried on said drive shaft and being axially slidable thereon, said weight means being driven by said spring carrier means through a torsion spring; and disc brake means carried by cooperating portions of said housing and said weight means to vary the rotational speed of said weight means as said weight means shifts along the drive shaft during abrupt deceleration of the vehicle, said weight means arranged to be rotated with said drive shaft by the interconnection of said torsion spring and spring carrier with said cam means during conditions of operation when no vehicle linear deceleration and vehicle wheel deceleration is experienced, said weight means responsive to changes in vehicle wheel deceleration tending to rotate at a different rotational speed than said drive shaft causing said spring carrier to rotate said ball relative to said cam means thereby axially moving said valve means into fluid cutoff disposition relative to said inlet and said outlet, the difference in rotational speed between said drive shaft and said weight means being modulated during vehicle linear deceleration by a proportioning of the force exerted on said cam means by a shifting of said weight means into said disc brake means thereby impeding the rotation of said weight means.

3. A brake anti-lock device according to claim 2 wherein said spring carrier means includes a pin cooperating with an arcuate slot in said cam means to allow limited relative rotational movement therebetween, the limited rotational movement being utilized by said ball carried by said spring carrier to move on a rotary inclined surface of said cam means to move said cam means axially relative to said drive shaft thereby forcing said valve means to a closed position, said spring carrier means being rotated at a different speed than said cam means by the engagement of the weight means through a torsional connection with said spring carrier means when the weight means has been rotated at a given speed and said drive shaft is abruptly rotated at a lower rotational speed.

4. A brake anti-skid device comprising: a housing carried by a vehicle; drive means rotatably carried in said housing and being rotated at a speed proportional to vehicle wheel speed; an inlet in said housing from a source of pressure and an outlet in said housing to a pressure modulator for vehicle brakes; valve means slidably disposed in said housing and arranged to selectively control fluid communication between said inlet and said outlet; a weight means circumferentially carried on said drive means being rotatable and axially slidable on said drive means in response to vehicle and wheel speed changes; and valve actuating means non-rotatable with respect to said drive means and slidable thereon, said valve actuating means including means for torsionally engaging said weight to provide a rotatable driving connection between said drive means and said weight, said housing includes friction means engageable by said weight means under conditions of abrupt vehicle linear speed change to compensate for changes in vehicle wheel speed thereby making said weight means rotational speed more closely approximate the rotational speed of said drive means and delaying the movement of said valve actuating means into said valve means.

5. A brake anti-skid device according to claim 4 wherein said friction means is a series of friction plates cooperating with complementary shaped portions of said weight means to form a variable torque clutch arrangement.

References Cited by the Examiner

UNITED STATES PATENTS

| 2,012,366 | 8/1935 | Wevers | 188—181 |
| 2,136,573 | 11/1938 | Campbell | 303—24 |
| 2,913,072 | 11/1959 | Williams | 188—181 |
| 2,992,859 | 7/1961 | Sampietro | 303—24 |
| 3,099,499 | 7/1963 | Parshall | 303—21 |

EUGENE G. BOTZ, *Primary Examiner.*